UNITED STATES PATENT OFFICE.

JAMES CONNELL, OF PORT HURON, MICHIGAN, ASSIGNOR TO HIMSELF, CHRISTIAN CONNELL, AND WILLIAM CONNELL, OF SAME PLACE.

IMPROVEMENT IN CONCENTRATED EXTRACTS FOR TANNING PURPOSES.

Specification forming part of Letters Patent No. 27,859, dated April 10, 1860.

*To all whom it may concern:*

Be it known that I, JAMES CONNELL, of Port Huron, St. Clair county, Michigan, have invented a new and useful article of manufacture, termed by me "Concentrated Extract of Bark for Tanners' or Dyers' Use," of which the following is a full, clear, and exact description of the same and mode of its preparation.

At the present time those barks used by the tanner and dyer in their manufactures are only obtained in any considerable quantity from the native forests. The long distance it is now necessary to transport these articles to those markets where the demand is the greatest, the great bulk of the article, as well as the large amount of waste in transportation, so enhance the cost as to prevent its being used with economy in the large and extensive tanneries near our large cities and along the sea-board. It is well known that the bulk and weight of the tanning and coloring principle contained in the wood, bark, and leaves of trees bear but a small proportion to the weight and bulk of the tree. Hence many attempts have been made to produce a concentrated aqueous extract of those tanning and coloring principles as an article of manufacture and commerce, but without success, except in one or two cases, and from those trees which contain a large amount of the tanning and coloring principle from which the catechu or cutch is produced.

The great difficulty in the production as an article of manufacture and commerce of an inspissated or solid aqueous extract of the tanning and coloring principles found in the wood, bark, and leaves of trees arises from the liability of these aqueous extracts to fermentation and decomposition, and also from the fact that the aqueous extract cannot be evaporated to dryness without destroying the tanning and coloring principle it contains or rendering it worthless for tanning or coloring purposes.

The object of my invention is the production, as an article of manufacture and commerce, of a concentrated aqueous extract of the tanning and coloring principles contained in trees and shrubs that will resist the action of the atmosphere and will not be liable to ferment or decompose.

In the manufacture of this article I take either the whole tree or shrub, or only those parts which contain the greatest amount of the tanning and coloring principles, and make either a cold or hot aqueous extract of these principles in the usual manner. The extract is then concentrated by evaporation, and when reduced to the proper degree of consistency by this process I add to it a sufficient quantity of dried ground bark to prevent fermentation and decomposition. I have found by long practice and repeated experiments that the addition of ground bark to the concentrated extract prevents it from fermenting and decomposing, so that it is unaffected by the atmosphere and will bear transportation to any climate without injury. In mixing with this concentrated extract for its preservation desiccated ground bark it will be seen that the qualities or properties of the extract are not deteriorated or changed thereby; neither is its bulk or weight increased by the addition of inert foreign matter, as the bark contains in a greater degree than any other parts of the tree the principles of the extract itself. Thus I produce a better article, in which there is less waste (as the whole mass is available) than those concentrated extracts of tanning which have heretofore been made with the admixture of foreign material containing none of the principles of the extract itself.

What I claim as a new article of manufacture is—

A concentrated aqueous extract of the tanning and coloring principle contained in trees and shrubs, when prepared substantially in the manner described.

In testimony whereof I have subscribed my name.

JAMES CONNELL.

Witnesses:
F. SOUTHGATE SMITH,
EDWIN JAMES.